United States Patent Office 3,753,948
Patented Aug. 21, 1973

3,753,948
PREPARATION OF POLYAMIC ACIDS IN KETONE SOLVENTS
George L. Brode, Somerville, and James H. Kawakami, Piscataway, N.J., assignors to Union Carbide Corporation, New York, N.Y.
No Drawing. Filed June 9, 1971, Ser. No. 151,597
Int. Cl. C08g 20/32
U.S. Cl. 260—49
7 Claims

ABSTRACT OF THE DISCLOSURE

Polyamic acids have been prepared by the interfacial polymerization of trimellitoyl chloride with sulfone ether diamines by adding a ketone solution of the former to the diamine dispersed in water containing an HCl scavenger with shearing agitation. The polymerization proceeds rapidly and the product polyamic-acid can be recovered directly from the reaction mixture in which it is insoluble. The polyamic-acid can then be thermally or chemically dehydrated to the corresponding polyamide-imide.

BACKGROUND OF THE INVENTION

This invention pertains to a facile and rapid method of preparing high molecular weight polyamic acids and more particularly to the interfacial polymerization of trimellitoyl chloride with a sulfone ether diamine.

Previous methods of preparation of polyamic acids require the use of expensive solvents, anhydrous conditions, exact stoichiometries of the reactants and long reaction times. These methods also necessitate the recovery of the polyamic acids produced by coagulation from a non-solvent which require the recovery of the initial polymerization solvent via distillation steps adding to the overall expenses of the process.

Although interfacial polymerization techniques with diacid chlorides have been known, they have not been successfully applied to dianhydride monomers or anhydride acid-chlorides.

STATEMENT OF THE INVENTION

A method for the preparation of polyamic-acids has now been found which does not require the use of anhydrous solvents and monomers of highest purity, does not require exact stoichiometry of the reactants, affords polyamic-acids which can be recovered quickly simply by filtration rather than by precipitation, and which affords high molecular weight polyamic-acids in relatively short polymerization times, that is, in the order of 5 to 10 minutes.

This method comprises adding a solution of: (A) about 1 mole of trimellitoyl chloride dissolved in at least one normally liquid ketone selected from the class consisting of aliphatic ketones having 1 to about 4 carbon atoms in each of the aliphatic moieties and cycloaliphatic ketones having about 5 to 8 carbon atoms to: (B) a mixture of about 1 mole of a sulfone ether diamine having the formula:

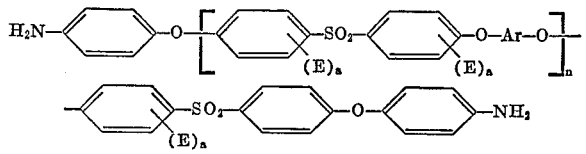

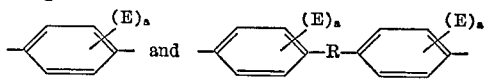

wherein Ar is a divalent radical selected from the group consisting of

[structures with (E)$_a$ and R groups]

wherein each E is a halogen substituent, and can be F, Cl, Br or I, each $a$ is an integer having values of 0 to 4, R is an alkylidene radical having 1 to about 10 carbon atoms, and $n$ is a rational number having values of 0 to 25 and about 0.9 to 2.0 moles of a hydrogen chloride scavenger dissolved in an aqueous solvent at a temperature of about 5° C. to about 100° C. with shearing agitation until normally solid polyamic acid forms.

Pressure is not critical and so super-atmospheric as well as sub-atmospheric pressures can be used although atmospheric pressure is preferred for economic reasons.

The polymerization can be carried out at temperatures of from about 5 to about 100° C. but it is preferred to provide the temperature range of about 25 to 75° C.

Exemplary of the aliphatic ketones which can be used in this invention are methyl ethyl ketone, diethyl ketone, methyl propyl ketone, ethyl propyl ketone, methyl butyl ketone, ethyl butyl ketone, and the like.

Exemplary cycloaliphatic ketones include cyclopentanone, cyclohexanone, methylcyclopentanone, dimethylcyclopentanone, methylcyclohexanone, cycloheptanone, and the like.

Suitable hydrogen chloride scavengers include tertiary amines containing aliphatic substituents such as trimethylamine, triethylamine, tripropylamine, tributylamine, and the like. Other reagents which can be used include cyclic organic bases, such as, pyridine, lutidine, collidine, quinoline, and the like, inorganic bases such as alkali metal hydroxides, alkali metal carbonates, alkali metal acetates, alkaline earth oxide, alkaline earth hydroxides, alkaline earth carbonates, alkali earth acetates, and the like; and organic oxides such as ethylene oxide, propylene oxide, and the like.

Exemplary alkali metal hydroxides include sodium potassium, lithium and like hydroxides.

The reaction can be better understood by the sequence of reactions shown below between trimellitoyl chloride and a specific diamine.

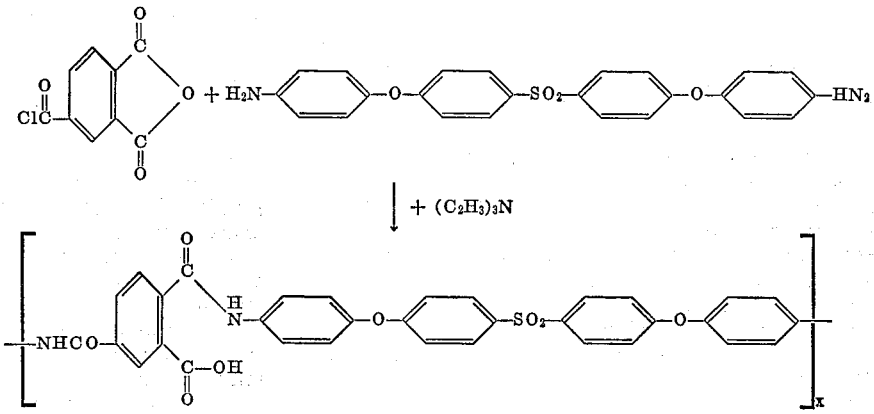

wherein $x$ is a number representing the degree of polymerization, and is sufficiently large so as to afford a normally solid high molecular weight polyamic acid.

The agitation used during the polymerization reaction must be the shearing type keeping heterogeneous phases dispersed in small particles or globules as distinct from paddle type agitation which merely keeps a bulk in motion without vigorous intermixing. The shearing agitation required in the practice of this invention is provided by a Waring Blendor, Cowles Dissolver or any similar blending device having high speed, knife-edge mixing blades.

This reaction can be surprisingly employed with crude diamines and still affords high molecular weight polyamic acids. Solution of the diamine such as are obtained in the preparation of the diamine can even be added to the polymerization reactor and the diamine precipitated therein and used directly with no purification. Obviously, these advantages enhance the economics of the process. The diamines used in this invention can be prepared by the condensation of the sodium salt of p-aminophenol: (1) with an equivalent amount of p-dichlorodiphenyl sulfone alone in one instance; (2) with an equimolar quantity of both p-dichlorodiphenyl sulfone and bisphenol-A[2,2-bis(p-hydroxyphenyl)propane], plus a further amount of p-dichlorodiphenyl sulfone equivalent to the amount of the sodium salt of p-aminophenol used; and (3) with an equimolar quantity of both p-dichlorodiphenyl sulfone and hydroquinone plus an amount of p-dichlorodiphenyl sulfone equivalent to the amount of the sodium salt of p-aminophenol used.

These reactions are delineated in the equations below:

(1)
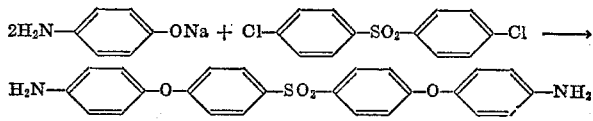

(2)
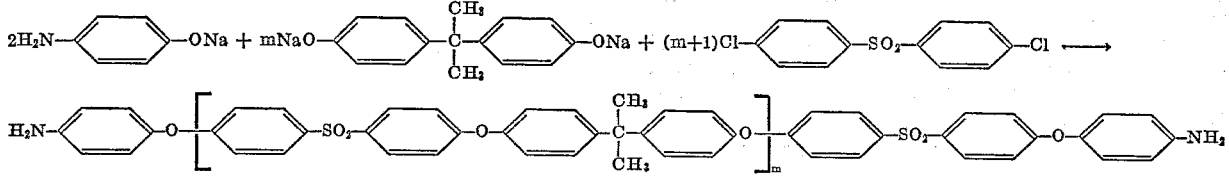

wherein $m$ is a rational number having average product distribution values ranging from 0 to about 25.

(3)
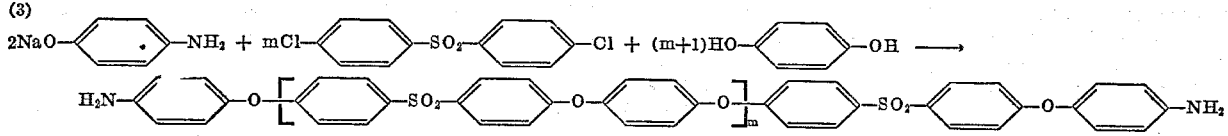

wherein $m$ is as defined above.

The polyamic acids prepared by the claimed process can be dehydrated to polyamide-imides either thermally or chemically by the use of dehydrating agents such as, aliphatic acid anhydrides including acetic anhydride, halogenated compounds such as $POCl_3$ or $SOCl_2$, molecular sieves, silica gel, phosphorous pentoxide, aluminum oxide, and the like. The resultant polyamide-imides are particularly useful for the fabrication of structural laminates and for the preparation of electric wire coatings, dielectric films, molded parts, and the like.

The polyamic acids can also be used directly in the above-described areas by depositing them directly or from solution on the appropriate substrate and then thermally dehydrating them to polyamide-imides.

The invention is further described in the examples which follow. All parts and percentages are by weight unless otherwise specified.

EXAMPLE 1

(A) Preparation of sulfone ether diamine

A 5 liter flask fitted with a mechanical stirrer, gas inlet tube, condenser, thermometer and Barrett tube was charged with 500 g. (4.58 moles) of p-aminophenol, 0.933 liter of dimethyl-sulfoxide and 1.2 liters of toluene. The solution was stirred under an argon atmosphere overnight after which time 36.94 g. (4.53 moles) of sodium hydroxide dissolved in sufficient water to afford a 49.00% aqueous solution was added. The water was removed from the toluene azeotrope which refluxed out of the flask as the temperature was raised gradually to 120° C. using the Barrett tube. At a pot temperature of 120° C. all of toluene was removed by distillation. The reaction mixture was cooled to 110° C. and 649.0 g. (2.26 moles) of dichlorodiphenylsulfone was added. The pot was heated to 160° C. for two hours and cooled to room temperature. The product, 4,4'-bis(p-oxyphenyleneamine) diphenyl sulfone was recovered by coagulation in water and amounted to 976 grams.

(B) Interfacial polymerization of sulfone etherdiamine to polyamic acid

A one-quart Waring Blendor was charged with 2.4 g. (0.06 mole) of sodium hydroxide pellets dissolved in 200 ml. of water and 17.5 g. of the sulfone etherdiamine prepared as in A above, while stirring rapidly. Then 8.42 g. of trimellitoyl chloride dissolved in 150 ml. of cyclohexanone was rapidly added to the blender.

The reaction mixture rose in temperature to about 28° C. and turned very viscous. The agitation was stopped after 15 minutes and the reaction mixture poured into excess acetone, precipitating the polyamic acid. This was filtered, washed with water and acetone and dried. The polyamic acid was then dissolved in dimethylacetamide and converted to a polyamide-imide by imidization with a mixture of 10 ml. of acetic anhydride and 20 ml. of pyridine, stirring at room temperature overnight. The resultant polyamide-imide was coagulated in acetone and dried at 100° C. in a vacuum oven overnight. The yield was 18.1 grams. The reduced viscosity of the polyamide-imide measured at a concentration of 0.2 g. in 100 ml. of dimethylacetamide at 25° C. was 0.6.

EXAMPLE 2

A Waring Blendor was charged with a crude mixture of 16.8 g. of sulfone etherdiamine in dimethyl sulfoxide prepared as in Example 1A before coagulation, 100 ml. of water, 100 ml. of methylethyl ketone and 8.2 g. (0.039 mole) of triethylamine. Then a solution of 8.2 g. (0.039 mole) of trimellitoyl chloride in methylethyl ketone was added dropwise with rapid stirring. In ten minutes polyamic acid was filtered from the reaction mixture, washed with water and acetone and dried. The dried polyamic acid had a reduced viscosity of 0.28 when measured as 0.2 g. solution in 100 ml. of dimethylacetamide at 25° C.

EXAMPLE 3

When Example 1 is repeated with the exception that a diamine having the formula:

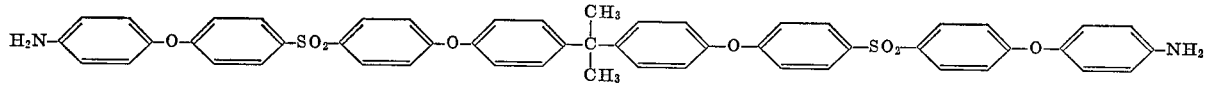

is used, a polyamide consisting essentially of repeating units have the following formula is obtained:

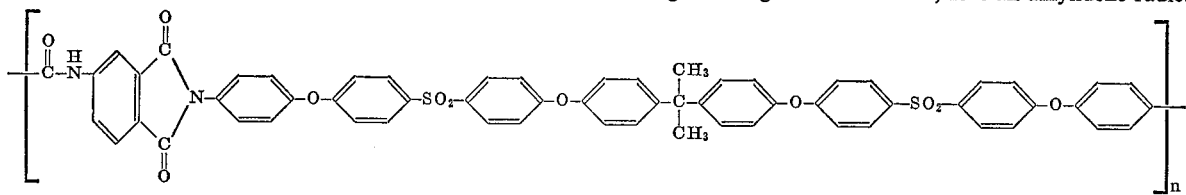

wherein $n$ is a number having a value sufficiently higher so as to afford a normally solid polyamide-imide.

The polyamide-imides prepared as described above have mechanical and physical properties similar to the polyamides-imides described in Ser. No. 50,968 now abandoned which is incorporated herein by reference.

Although the invention has been described in its preferred forms with a certain degree of particularity, it is understood that the present disclosure of the preferred forms has been made only by way of example and that numerous changes may be resorted to without departing from the spirit and the scope of the invention.

What is claimed is:

1. A method for the preparation of polyamic acids which comprises adding: (A) a solution of about one mole of trimellitoyl chloride dissolved in at least one normally liquid ketone selected from the class consisting of aliphatic ketones having 1 to about 4 carbon atoms in each of the aliphatic moieties and cycloaliphatic ketones having about 5 to 8 carbon atoms to: (B) a mixture of about one mole of sulfone ether diamine having the formula:

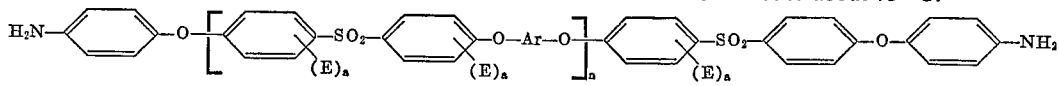

wherein Ar is a divalent radical selected from the group consisting of $$\underset{\text{(E)}_a}{\underset{}{\bigcirc}} \text{ and } \underset{\text{(E)}_a}{\underset{}{\bigcirc}} -\text{R}- \underset{\text{(E)}_a}{\underset{}{\bigcirc}}$$

wherein each E is a halogen substituent, each $a$ is an integer having values of 0 to 4, R is an alkylidene radical having 1 to about 10 carbon atoms, and $n$ is a rational number having values of 0 to about 25, and about 0.9 to 2.0 moles of a hydrogen chloride scavenger dissolved in an aqueous solvent, at a temperature of about 5° C. to about 100° C. with shearing agitation until a normally solid polyamic acid forms.

2. Method claimed in claim 1 wherein $n=1$, $a=0$, and Ar is $$\underset{\text{(E)}_a}{\underset{}{\bigcirc}} -\text{R}- \underset{\text{(E)}_a}{\underset{}{\bigcirc}}$$

3. Method claimed in claim 2 wherein R is an isopropylidene radical.

4. Method claimed in claim 1 wherein the normally liquid ketone is an aliphatic ketone.

5. Method claimed in claim 1 wherein the hydrogen chloride scavenger is triethylamine.

6. Method claimed in claim 1 wherein the hydrogen chloride scavenger is an alkali metal hydroxide.

7. Method claimed in claim 1 wherein the temperature is about 25° C. to about 75° C.

References Cited

UNITED STATES PATENTS

| | | | |
|---|---|---|---|
| 3,428,602 | 2/1969 | Haller | 260—47 |
| 3,652,498 | 3/1972 | Morello et al. | 260—47 |
| 3,658,938 | 4/1972 | Kwiatkowski et al. | 260—857 |

OTHER REFERENCES

Y. Imai et al., Journal of Polymer Science, Part B, vol. 8, No. 8, pp. 559–562, August 1970.

WILLIAM H. SHORT, Primary Examiner

L. L. LEE, Assistant Examiner

U.S. Cl. X.R.

260—78 TF